(12) United States Patent
Ohta et al.

(10) Patent No.: US 8,214,104 B2
(45) Date of Patent: Jul. 3, 2012

(54) ABNORMAL NOISE INSPECTION METHOD FOR ANTI-VIBRATION DEVICE FOR VEHICLE USE

(75) Inventors: Katsutoshi Ohta, Kurashiki (JP);
Minoru Katayama, Kurashiki (JP);
Takashi Moriya, Kurashiki (JP);
Yoshinori Fujinami, Kurashiki (JP);
Tetsuya Miyake, Kurashiki (JP)

(73) Assignee: Kabushiki Kako Co., Ltd. (JP)

(*) Notice: Subject to any disclaimer, the term of this patent is extended or adjusted under 35 U.S.C. 154(b) by 1033 days.

(21) Appl. No.: 12/044,023

(22) Filed: Mar. 7, 2008

(65) Prior Publication Data
US 2008/0262672 A1    Oct. 23, 2008

(30) Foreign Application Priority Data

Apr. 17, 2007  (JP) ................................. 2007-108287
Apr. 17, 2007  (JP) ................................. 2007-108289

(51) Int. Cl.
*G01M 17/04*   (2006.01)
*G01M 7/02*    (2006.01)
(52) U.S. Cl. .................. 701/32.8; 701/29.1; 73/662
(58) Field of Classification Search .......... 701/29.1, 701/32.8; 73/662
See application file for complete search history.

(56) References Cited

U.S. PATENT DOCUMENTS

| | | | | |
|---|---|---|---|---|
| 3,400,578 A | * | 9/1968 | Frarey et al. | 73/112.01 |
| 3,690,162 A | * | 9/1972 | Stecher | 73/114.77 |
| 3,694,637 A | * | 9/1972 | Edwin et al. | 702/34 |
| 3,855,847 A | * | 12/1974 | Leschek | 73/587 |
| 4,332,161 A | * | 6/1982 | Kakino | 73/104 |
| 4,478,086 A | * | 10/1984 | Gram | 73/781 |
| 4,537,076 A | * | 8/1985 | Lax et al. | 73/662 |

(Continued)

FOREIGN PATENT DOCUMENTS

JP    S57-132036 A    8/1982

(Continued)

OTHER PUBLICATIONS

Instron 2004 Product Catalog, FastTrack 8800 Servohydraulic Test Systems.*

(Continued)

*Primary Examiner* — Darnell Jayne
*Assistant Examiner* — Sasha T Varghese
(74) *Attorney, Agent, or Firm* — Studebaker & Brackett PC; Donald R. Studebaker

(57) ABSTRACT

In an abnormal noise inspection method for an anti-vibration device for vehicle use, it is determined whether, during travel of a vehicle in which a supported member is supported to the vehicle body by an anti-vibration device, abnormal noise occurs or not in the passenger compartment owing to the anti-vibration device. The method includes: an input step of mounting to a shaker the anti-vibration device before it is assembled into the vehicle and then inputting vibrations in a predetermined pattern to a supported member-side mounting part of the anti-vibration device; a measurement step of measuring, during the inputting of vibrations, a transmission force output from a vehicle body-side mounting part of the anti-vibration device; an analysis step of frequency analyzing time-series data on the measured transmission force to obtain a power spectrum of the transmission force; and a determination step of estimating, based on the power spectrum of the transmission force and according to a predetermined evaluation criterion, whether a vehicle produces abnormal noise in the passenger compartment when it runs with the anti-vibration device mounted thereon.

5 Claims, 10 Drawing Sheets

U.S. PATENT DOCUMENTS

| | | | |
|---|---|---|---|
| 4,550,604 A * | 11/1985 | Sugimoto et al. | 73/587 |
| 4,644,794 A * | 2/1987 | Vaicaitis | 73/583 |
| 4,649,743 A * | 3/1987 | Sugimoto et al. | 73/162 |
| 4,779,853 A * | 10/1988 | Sugino et al. | 267/140.11 |
| 5,176,369 A * | 1/1993 | Ito | 267/140.13 |
| 5,210,704 A * | 5/1993 | Husseiny | 702/34 |
| 5,219,037 A * | 6/1993 | Smith et al. | 180/312 |
| 5,325,437 A * | 6/1994 | Doi et al. | 381/71.9 |
| 5,365,788 A * | 11/1994 | Hobbs | 73/665 |
| 5,384,853 A * | 1/1995 | Kinoshita et al. | 381/71.12 |
| 5,425,276 A * | 6/1995 | Gram et al. | 73/816 |
| 5,431,261 A * | 7/1995 | Olgac | 188/379 |
| 5,502,283 A | 3/1996 | Ukai et al. | |
| 5,565,618 A * | 10/1996 | Hu | 73/1.82 |
| 5,610,330 A * | 3/1997 | Fricke et al. | 73/146 |
| 5,675,505 A * | 10/1997 | Trimboli | 702/113 |
| 5,728,938 A * | 3/1998 | Choi et al. | 73/593 |
| 5,952,581 A * | 9/1999 | Lammers et al. | 73/831 |
| 6,023,980 A * | 2/2000 | Owen et al. | 73/797 |
| 6,101,882 A | 8/2000 | Tran et al. | |
| 6,170,326 B1 * | 1/2001 | Juranitch et al. | 73/162 |
| 6,182,515 B1 * | 2/2001 | Juranitch et al. | 73/862.08 |
| 6,186,485 B1 * | 2/2001 | Kawazoe | 267/140.14 |
| 6,355,986 B1 * | 3/2002 | Kato et al. | 290/40 C |
| 6,389,888 B1 * | 5/2002 | Juranitch et al. | 73/116.01 |
| 6,393,902 B1 * | 5/2002 | Juranitch | 73/116.01 |
| 6,507,790 B1 * | 1/2003 | Radomski | 702/39 |
| 6,523,422 B1 * | 2/2003 | Juranitch et al. | 73/862.322 |
| 6,529,838 B1 * | 3/2003 | Horiuchi et al. | 702/41 |
| 6,662,669 B2 * | 12/2003 | Juranitch et al. | 73/862.322 |
| 6,662,671 B1 * | 12/2003 | Kopp et al. | 73/865.8 |
| 6,732,591 B2 * | 5/2004 | Miles et al. | 73/808 |
| 6,736,002 B2 * | 5/2004 | Juranitch | 73/115.06 |
| 6,772,644 B2 * | 8/2004 | Juranitch et al. | 73/862.08 |
| 6,779,404 B1 * | 8/2004 | Brincker et al. | 73/659 |
| 6,813,960 B1 * | 11/2004 | Owen et al. | 73/808 |
| 6,836,706 B2 * | 12/2004 | Dormegnie et al. | 701/1 |
| 6,865,466 B2 * | 3/2005 | Voight et al. | 701/53 |
| 6,877,368 B2 * | 4/2005 | Juranitch et al. | 73/115.06 |
| 7,111,705 B2 * | 9/2006 | Ohta et al. | 180/312 |
| 7,194,398 B2 * | 3/2007 | Abe | 703/8 |
| 7,204,152 B2 * | 4/2007 | Woodward et al. | 73/794 |
| 7,204,153 B2 * | 4/2007 | Phipps | 73/808 |
| 7,296,650 B2 * | 11/2007 | Ohta et al. | 180/312 |
| 7,437,274 B2 * | 10/2008 | Charette et al. | 702/184 |
| 7,523,654 B2 * | 4/2009 | Zeitlin et al. | 73/115.07 |
| 2002/0017144 A1 * | 2/2002 | Miles et al. | 73/808 |
| 2002/0103595 A1 * | 8/2002 | Kostun | 701/111 |
| 2002/0107625 A1 * | 8/2002 | Beck et al. | 701/50 |
| 2003/0088346 A1 * | 5/2003 | Calkins et al. | 701/29 |
| 2004/0015251 A1 * | 1/2004 | Hamada et al. | 700/94 |
| 2004/0243351 A1 * | 12/2004 | Calkins et al. | 702/185 |
| 2006/0059993 A1 * | 3/2006 | Temkin et al. | 73/669 |
| 2006/0261529 A1 | 11/2006 | Yamamoto et al. | |

FOREIGN PATENT DOCUMENTS

| | | |
|---|---|---|
| JP | S59-109831 A | 6/1984 |
| JP | S59-136625 A | 8/1984 |
| JP | S64-13434 A | 1/1989 |
| JP | 03-209144 | 9/1991 |
| JP | 04-221740 | 8/1992 |
| JP | H5-256120 A | 10/1993 |
| JP | 06-288872 | 10/1994 |
| JP | 08-247381 | 9/1996 |
| JP | H09-54016 A | 2/1997 |
| JP | H10-26580 A | 1/1998 |
| JP | 10-082689 | 3/1998 |
| JP | 10-170389 | 6/1998 |
| JP | 11-023411 | 1/1999 |
| JP | 11-241945 | 9/1999 |
| JP | 2002-073703 | 3/2002 |
| JP | 2002-131174 | 5/2002 |
| JP | 2002-147520 | 5/2002 |
| JP | 2003-028749 A | 1/2003 |
| JP | 2003-085157 | 3/2003 |
| JP | 2003-214944 | 7/2003 |
| JP | 2004-020326 | 1/2004 |
| JP | 2006-177526 A | 7/2006 |
| JP | 2006-329879 | 12/2006 |
| JP | 2007-271268 | 10/2007 |

OTHER PUBLICATIONS

The Extended European Search Report dated Jul. 2, 2010; Application No. / Patent No. 08004396.1-1236 / 1983327.

* cited by examiner

ABNORMAL NOISE INSPECTION METHOD FOR ANTI-VIBRATION DEVICE FOR VEHICLE USE

BACKGROUND OF THE INVENTION (a) Field of the Invention

This invention relates to a method for inspecting whether abnormal noise occurs or not in a passenger compartment of a vehicle during cruising owing to an anti-vibration device for vehicle use, such as an engine mount, which will be interposed between a vehicle body and a supported member.

(b) Description of Related Art

An example of conventional techniques for inspecting whether abnormal noise occurs or not in a passenger compartment of a vehicle owing to an anti-vibration device for vehicle use is an in-vehicle sensory inspection in which an inspector in a passenger compartment sensorily determines whether abnormal noise occurs or not while being in a running finished vehicle under actual driving conditions or in a running finished vehicle under simulated driving conditions as disclosed, for example, in Japanese Patent No. 2623884 or Published Japanese Patent Application No. 2006-329879. Another example is an inspection in which whether abnormal noise occurs or not is determined by detecting sounds in a passenger compartment with a microphone. According to conventional techniques for inspecting whether abnormal noise occurs or not owing to an anti-vibration device for vehicle use, the inspection can be made only on finished vehicles in which the anti-vibration device is assembled.

However, inspecting whether abnormal noise occurs or not using a finished vehicle provides poor inspection efficiency. Furthermore, for example, if it is determined that abnormal noise occurs in the finished vehicle, the vehicle-mounted anti-vibration device, which is a cause of abnormal noise production, must be replaced with an appropriate one. This invites large cost.

SUMMARY OF THE INVENTION

The present invention has been made in view of the foregoing points and, therefore, an object of the present invention is to easily inspect whether abnormal noise occurs or not in a passenger compartment owing to an anti-vibration device for vehicle use.

To solve the above problems, in the present invention, abnormal noise inspection is made, based on the following finding, on an anti-vibration device before it is assembled into a vehicle.

The mechanism of occurrence of abnormal noise due to an anti-vibration device can be believed to be as follows. First, a relative displacement between a vehicle body and a supported member causes a phenomenon leading to abnormal noise production in the anti-vibration device, such as hit between parts in the anti-vibration device. Then, a force due to the phenomenon propagates through the anti-vibration device. It can be believed that the force is transmitted through a vehicle body-side mounting part, which is a connecting part between the anti-vibration device and the vehicle body, to the vehicle body and then propagates through the vehicle body and finally takes the form of abnormal noise in the passenger compartment. Therefore, the sound pressure level of abnormal noise produced in the passenger compartment can be expressed in the following equation:

(sound pressure level in passenger compartment)=
(vehicle body sensitivity)×(transmission force)

wherein "transmission force" means the force transmitted from the anti-vibration device to the vehicle body and "vehicle body sensitivity" means the ease of propagation of the force through the vehicle body. According to the above equation, as the transmission force is relatively large, the sound pressure level becomes high and abnormal noise thereby will occur in the passenger component. On the other hand, as the transmission force is relatively small, the sound pressure level becomes low and abnormal noise thereby will not occur in the passenger compartment.

Based on the above finding, in the present invention, an anti-vibration device before it is assembled into a vehicle is separately measured for the magnitude of transmission force and the measured magnitude of transmission force is evaluated, whereby whether abnormal noise occurs or not in the passenger compartment can be estimated without the need to assemble the anti-vibration device into the vehicle.

An aspect of the invention is an abnormal noise inspection method for an anti-vibration device for vehicle use and the method includes: an input step of mounting to a shaker an anti-vibration device before assembled into a vehicle and then inputting vibrations in a predetermined pattern to a supported member-side mounting part of the anti-vibration device; a measurement step of measuring, during the inputting of vibrations, a transmission force output from a vehicle body-side mounting part of the anti-vibration device; an analysis step of frequency analyzing time-series data on the measured transmission force to obtain the power spectrum of the transmission force; and a determination step of estimating, based on the power spectrum of the transmission force and according to a predetermined evaluation criterion, whether a vehicle produces abnormal noise in the passenger compartment owing to the anti-vibration device when the vehicle runs with the anti-vibration device mounted thereon.

In this aspect of the invention, an anti-vibration device before it is assembled into a vehicle is mounted to a shaker and vibrations in a predetermined pattern are input to a supported member-side mounting part of the anti-vibration device. Thus, a force is output from a vehicle body-side mounting part of the anti-vibration device. The force corresponds to a transmission force to be transmitted from the anti-vibration device to the vehicle body when the anti-vibration device is assembled into the vehicle. Therefore, the transmission force of the anti-vibration device is measured by measuring the force output from the vehicle body-side mounting part.

Furthermore, the power spectrum of the transmission force can be obtained by frequency analyzing time-series data on the measured transmission force. Furthermore, based on the power spectrum of the transmission force (i.e., the power of the transmission force), it can be estimated whether abnormal noise occurs or not in the passenger compartment owing to the anti-vibration device when the anti-vibration device is mounted on the vehicle, as described above.

According to this aspect of the invention, whether abnormal noise occurs or not in the passenger compartment can be thus previously estimated from the anti-vibration device separately from the vehicle. Therefore, as compared with conventional inspections for finished vehicles, the inspection efficiency can be significantly enhanced. Furthermore, since there is no need for additional work, such as replacement of the anti-vibration device, when it has been estimated that abnormal noise occurs, the cost can be significantly reduced.

In the above mechanism of occurrence of abnormal noise, the vehicle body sensitivity varies according to variations in the structure or other characteristics of the vehicle body. Therefore, even if the transmission force does not change, abnormal noise may occur or may not occur depending upon the magnitude of the vehicle body sensitivity. Thus, whether abnormal noise occurs or not relies also on variations in vehicle body sensitivity. Therefore, in estimating whether abnormal noise occurs or not from the anti-vibration device separately from the vehicle as in this aspect of the invention, it is preferable to take variations in vehicle body sensitivity into consideration.

Hence, it is preferable that in the analysis step the power spectrum of the transmission force is used to calculate the overall power in a particular frequency interval including the frequency of abnormal noise to be produced in the passenger compartment, and in the determination step whether abnormal noise occurs or not in the passenger compartment is estimated based on whether the calculated overall power is above a predetermined evaluation threshold.

In short, whether abnormal noise occurs or not in the passenger compartment is estimated not based on the power at a particular frequency but based on the overall power in a particular frequency interval (a so-called partial overall). Thus, whether abnormal noise occurs or not can be estimated in consideration of a factor of variations in vehicle body sensitivity.

In the input step, sine-wave vibrations of constant amplitude and constant frequency may be input to the supported member-side mounting part of the anti-vibration device.

By inputting such steady-state vibrations to the anti-vibration device, whether steady abnormal noise synchronized with input vibrations occurs or not can be inspected.

Furthermore, the abnormal noise inspection method according to the present invention may be configured so that in the analysis step the power spectrum of the transmission force is subjected to a peak hold processing and the power spectrum, after being subjected to the peak hold processing, is used to calculate the overall power in the particular frequency interval including the frequency of abnormal noise to be produced in the passenger compartment, and that in the determination step whether abnormal noise occurs or not in the passenger compartment is estimated based on whether the calculated overall power is above the predetermined evaluation threshold.

Thus, by subjecting the power spectrum of the transmission force to a peak hold processing in the analysis step, it can be estimated whether unsteady abnormal noise not synchronized with input vibrations occurs or not in the passenger compartment.

In the input step, sine-wave vibrations of constant amplitude of which frequency is swept over a predetermined range may be input to the supported member-side mounting part of the anti-vibration device.

By inputting vibrations whose frequency changes in the predetermined range to the anti-vibration device in the above manner, it can be inspected whether unsteady abnormal noise not synchronized with input vibrations occurs or not.

DETAILED DESCRIPTION OF THE INVENTION

Engine Mount Structure

Figure 1:
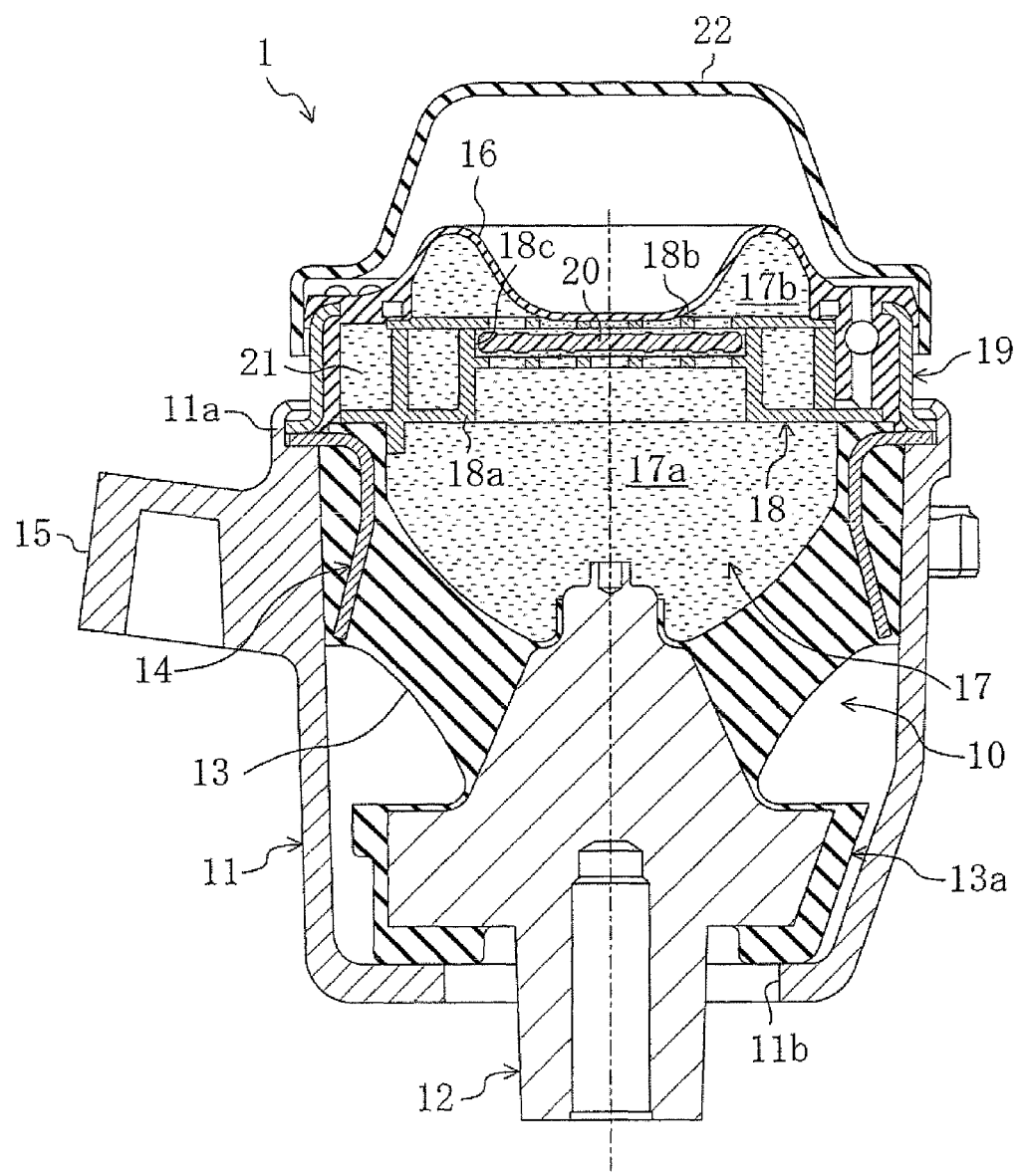
FIG. 1 is a cross-sectional view showing an engine mount to be inspected by an abnormal noise inspection method according to an embodiment of the invention.

FIG. 1 shows an engine mount 1 to be inspected for the occurrence of abnormal noise in an embodiment of the present invention.

The engine mount 1 is formed so that a mount body 10 with a fitting 12 (vehicle body-side mounting part) to be connected to a vehicle body is contained in a substantially cylindrical case 11 integrally formed with a connecting part 15 (supported member-side mounting part) to be connected to an engine-side member of the vehicle.

The mount body 10 is formed so that the fitting 12 and a metal fixing member 14 are connected to each other by a rubber elastic material 13. The fixing member 14 is fixed to the case 11, as described later, so that it is crimped by a crimping part 11a of the case 11.

The fitting 12 has a radially outwardly bulging intermediate part, an upper part located above the intermediate part and formed in a substantially conical shape upwardly reducing its diameter, and a lower part located below the intermediate part and formed in a substantially cylindrical shape. The conical upper part of the fitting 12 is joined to the lower end of the rubber elastic material 13, and the cylindrical lower part thereof is inserted in a hole 11b formed in the bottom of the case 11. The fitting 12 has a bolt hole opening at the bottom face and can be fixed to the vehicle body by inserting the bolt into the bolt hole, although not shown. The intermediate part of the fitting 12 is covered with a rubber stopper 13a continued to the rubber elastic material 13.

The rubber elastic material 13 extends radially outwardly and upwardly from its lower end joined and fixed to the conical peripheral face of the fitting 12 as described above and has an upwardly opening upper end.

Furthermore, the fixed member 14 is embedded in an upper part of the rubber elastic material 13. The upper end of the fixed member 14 extends radially outward from the outer periphery of the rubber elastic material 13. The extending part of the fixed member 14 is crimped by the crimping part 11a provided at the upper end of the case 11, whereby the upper part of the rubber elastic material 13 is fixed to the case 11.

A rubber diaphragm 16 is disposed on top of the mount body 10 to cover the upper end opening of the rubber elastic material 13. The diaphragm 16 and the rubber elastic material 13 constitute a liquid chamber 17 filled with buffer solution.

Furthermore, a metal orifice disk 18 is fitted in the diaphragm 16 to divide the liquid chamber 17 into a pressure receiving chamber 17a towards the rubber elastic material 13 and a balancing chamber 17b towards the diaphragm 16 with the orifice disk 18 interposed therebetween.

An annular fitting 19 is fitted on the outer periphery of the diaphragm 16. The lower end of the annular fitting 19 is crimped, together with the fixed member 14 of the mount body 10, by the crimping part ha of the case 11, whereby the diaphragm 16 is fixed to the case 11. Reference numeral 22 denotes a cover protector fitted on the diaphragm 16 to protect it.

The orifice disk 18 is composed of a body 18a and a disk-shaped lid 18b disposed adjoining the top face of the body 18a. The body 18a includes a helical orifice passage 21 formed in a portion of the orifice disk 18 towards the outer periphery thereof. The orifice disk 18 is clamped between the diaphragm 16 and the rubber elastic material 13 with the lid 18b lying over the body 18a, thereby being elastically supported in the mount body 10.

The body 18a further includes a recess 18c formed in a top center part thereof to accommodate a rubber movable plate 20. The bottom wall of the recess 18c has a plurality of vertical through holes formed therethrough. Also in the lid 18b, its center part corresponding to the region of the recess 18c has a plurality of vertical through holes formed therethrough.

Both the liquid chambers 17a and 17b divided by the orifice disk 18 are communicated with each other by the orifice passage 21. In the engine mount 1, the buffer solutions in both the pressure receiving chamber 17a and the balancing chamber 17b flow between both chambers via the orifice passage 21, thereby damping low-frequency, large-amplitude vibrations applied from the rubber elastic material 13 to the pressure receiving chamber 17a. In this case, the diaphragm 16 deforms to absorb volume changes of the balancing chamber 17b caused by the flow of the buffer solutions. To be specific, the diaphragm 16 outwardly swells with increasing volume of the balancing chamber 17b and contracts with decreasing volume thereof.

Furthermore, high-frequency, small-amplitude vibrations applied from the rubber elastic material 13 to the pressure receiving chamber 17a are damped by the movable plate 20 in the recess 18c moving therein.

Note that FIG. 1 shows the engine mount 1 in an unloaded state in which no static load acts on the mount body 10. In this state, the rubber stopper 13a of the mount body 10 comes close to the bottom of the case 11. On the other hand, although not shown here, when the engine mount 1 is in a 1G state in which it is mounted to the vehicle body and a static load is applied from the engine to the mount body 10, the rubber elastic material 13 bows to displace the case 11 relatively downward so that a certain clearance is created between the case bottom and the rubber stopper 13a.

Mechanism of Occurrence of Abnormal Noise Due to Engine Mount

Figure 2:
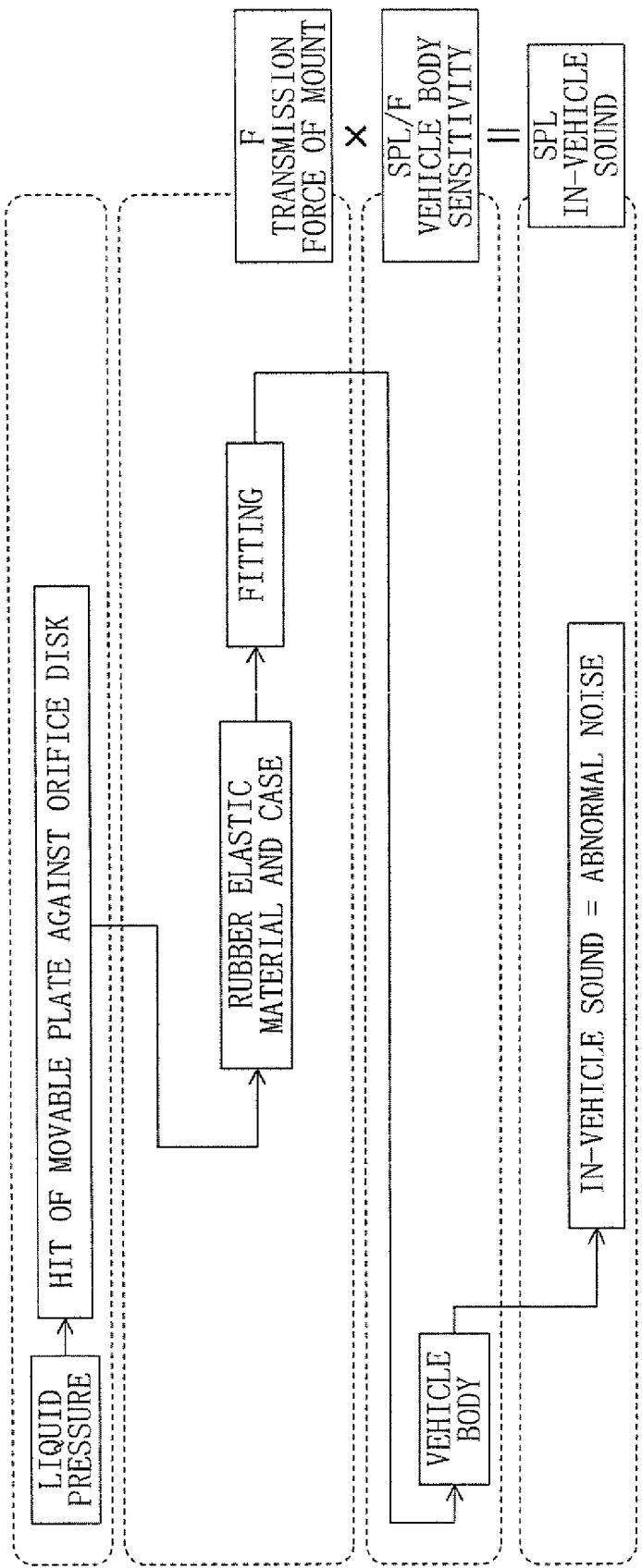
FIG. 2 is a block diagram illustrating a mechanism of occurrence of steady abnormal noise.

FIG. 2 shows a mechanism when abnormal noise occurs in a passenger compartment owing to the engine mount 1. When a large displacement is dynamically input to the engine mount 1, such as during cruising on a punishing road, a significant change in liquid pressure occurs in the engine mount 1. In this case, the movable plate 20 accommodated between the recess 18c in the body 19a of the orifice disk 18 and the lid 18b may hit against the body 18a or the lid 18b.

The force produced by the above hit is transmitted through the rubber elastic material 13 and the case 11 of the engine mount 1 to the fitting 12. Then, the force is transmitted from the fitting 12 to the vehicle body and then propagates through the vehicle body, whereby abnormal noise, such as a tapping sound, occurs in the passenger compartment. The occurrence of such abnormal noise is a steady phenomenon synchronized with input vibrations. Therefore, abnormal noise due to this steady phenomenon is hereinafter referred to as steady abnormal noise.

Figure 3:
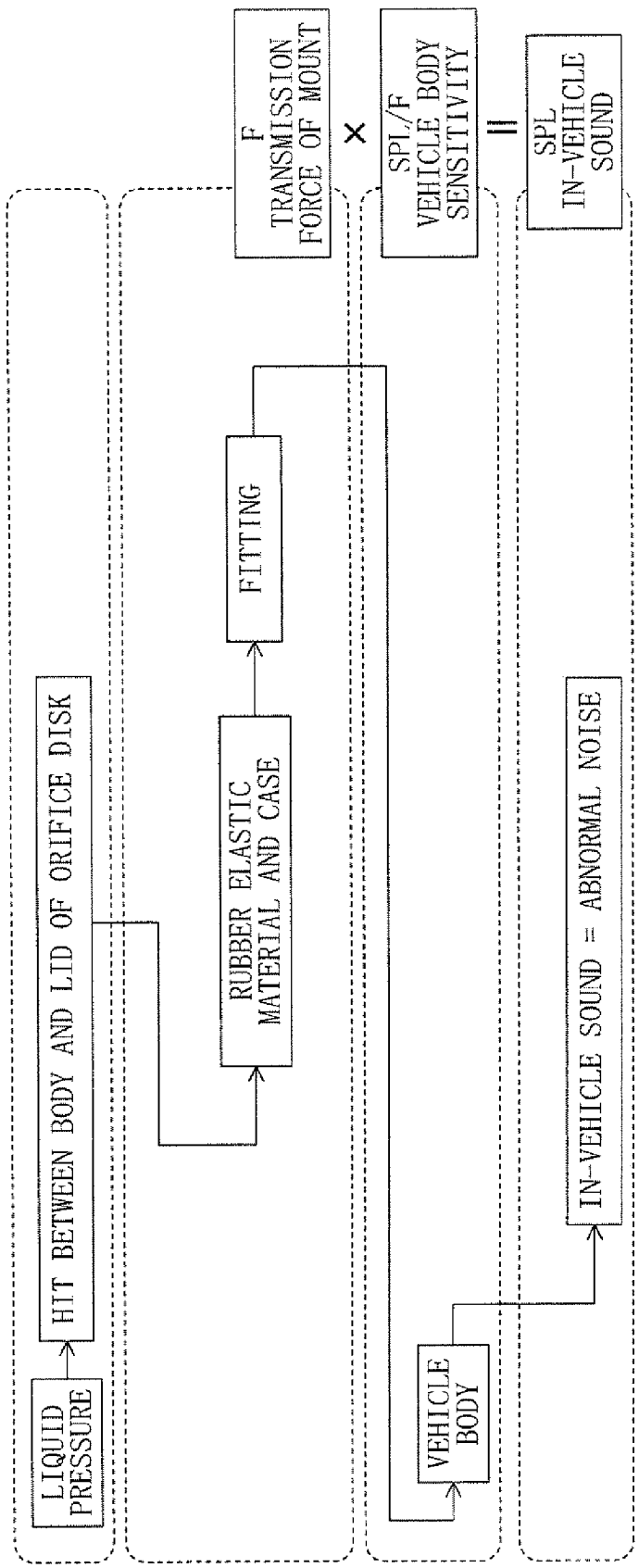
FIG. 3 is a block diagram illustrating a mechanism of occurrence of unsteady abnormal noise.

Furthermore, as shown in FIG. 3, depending upon conditions of the engine mount 1 including the fitting states of parts in the engine mount 1 and the fixed state of the rubber elastic material, a significant liquid pressure change in the engine mount 1 may create a clearance between the body 18a and the lid 18b that are clamped by the diaphragm 16 and the rubber elastic material 13, thereby hitting the body 18a and the lid 18b against each other. Also in this case, like the above, the force produced by the hit is transmitted through the rubber elastic material 13 and the case 11 of the engine mount 1 to the fitting 12. Then, the force is transmitted from the fitting 12 to the vehicle body and then propagates through the vehicle body, whereby abnormal noise, such as a clacking sound or a ticking sound, occurs in the passenger compartment. Such abnormal noise occurs when various conditions are met. Therefore, the occurrence of such abnormal noise is an unsteady phenomenon not synchronized with vibration input. Abnormal noise due to this unsteady phenomenon is hereinafter referred to as unsteady abnormal noise.

In the above manner, whichever of steady abnormal noise and unsteady abnormal noise occurs in the passenger compartment, it is produced by transmission of a force from the engine mount 1 to the vehicle body (hereinafter, the force is referred to as a transmission force) and propagation of the force through the vehicle body. Therefore, the sound pressure level of abnormal noise produced in the passenger compartment can be expressed in the following equation:

(sound pressure level in passenger compartment)=
(vehicle body sensitivity)×(transmission force).

According to the above equation, if the transmission force is large, the sound pressure level in the passenger compartment becomes high and is therefore recognized as abnormal noise. On the other hand, if the transmission force is small, the sound pressure level in the passenger compartment becomes low and is not therefore recognized as abnormal noise. Therefore, whether abnormal noise occurs or not in the passenger compartment can be estimated by measuring the magnitude of the transmission force of the engine mount 1. The magnitude of the transmission force can be measured from the engine mount 1 by itself without the need to assemble the engine mount 1 into the vehicle.

Based on this finding, in this embodiment, the magnitude of the transmission force of the engine mount 1 is measured using a shaker, thereby previously inspecting whether abnormal noise occurs or not in the passenger compartment.

In this case, according to the above equation, even if the magnitude of the transmission force does not change, abnormal noise may be determined to occur in the passenger compartment or determined not to occur therein depending upon variations in vehicle body sensitivity. Thus, if the vehicle body sensibility of a vehicle into which the engine mount 1 is assembled is large even when the transmission force of the engine mount 1 is determined to be relatively small by measuring it, abnormal noise will occur in the passenger compartment. Therefore, in determining whether abnormal noise occurs or not in the passenger compartment, it is necessary to take variations in vehicle body sensitivity into consideration.

In this embodiment, in order to absorb variations in vehicle body sensitivity, whether abnormal noise occurs or not in the passenger compartment is determined using the power spectrum of the measured transmission force and based on the magnitude of the overall power in a particular frequency interval, although described later in detail.

Furthermore, as described previously, the hit of the movable plate 20 against the body 18a or lid 18b is a steady phenomenon synchronized with input vibrations while the hit of the body 18a against the lid 18b is an unsteady phenomenon not synchronized with input vibrations. Such an unsteady phenomenon cannot be figured out if the power spectrum of the transmission force is calculated using summation averaging. Therefore, in determining whether abnormal noise due to such an unsteady phenomenon occurs or not, the power spectrum of the transmission force is calculated using a peak hold processing.

Configuration of Abnormal Noise Inspection System

Figure 4:
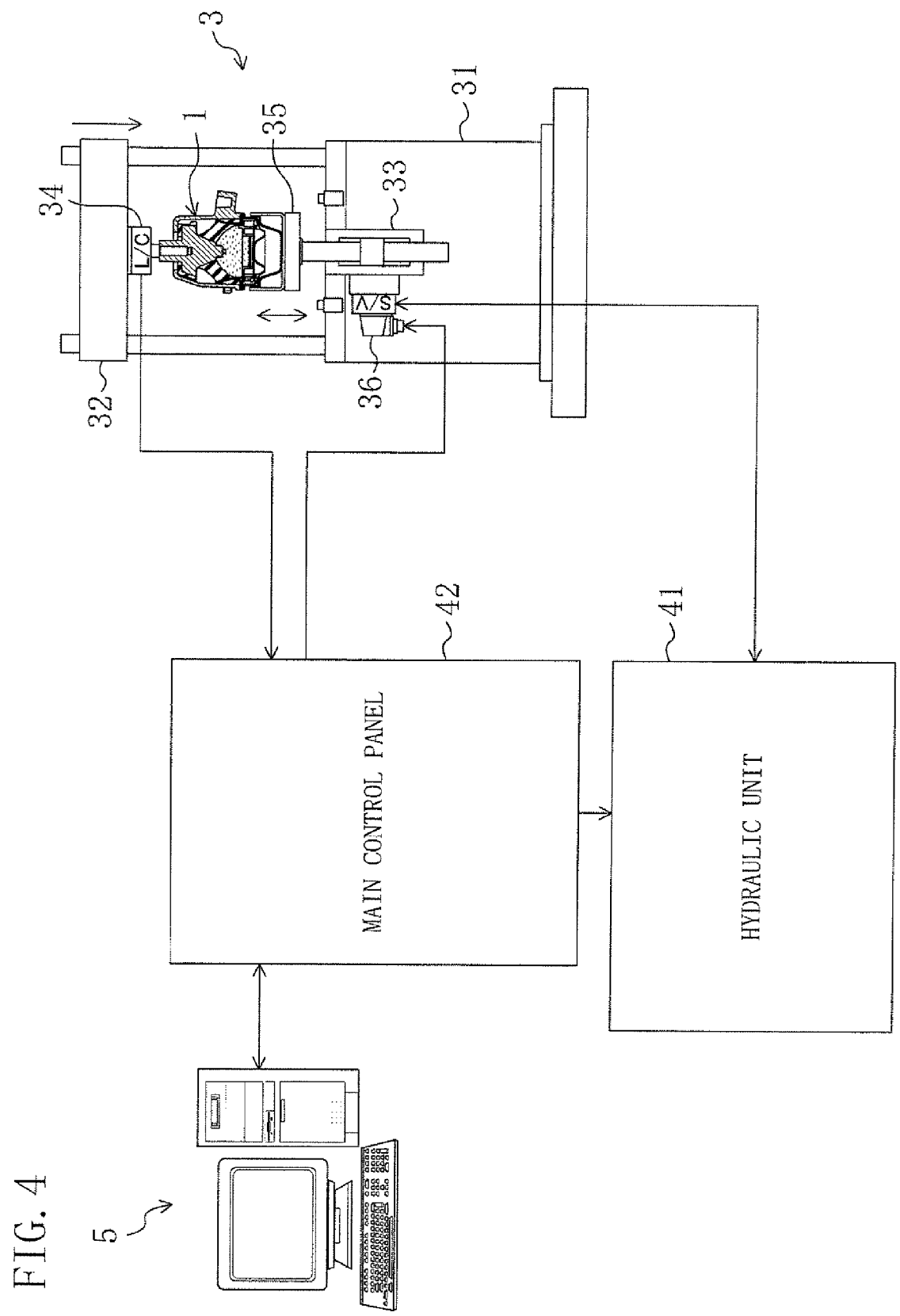
FIG. 4 is a block diagram of an inspection system for use in executing the abnormal noise inspection method according to the above embodiment.

FIG. 4 shows a block diagram of an abnormal noise inspection system for use in executing the abnormal noise inspection method according to this embodiment. This system is configured by including a shaker 3 for inputting vibrations to the engine mount 1 and measuring the transmission force output from the engine mount 1, a hydraulic unit 41 for supplying hydraulic pressure for vibration input to the shaker 3, a main control panel 42 for controlling the shaker 3 and the hydraulic unit 41, and a computer 5 for doing predetermined processings to data on the measured transmission force to estimate whether abnormal noise occurs or not owing to the engine mount 1.

The shaker 3 is configured by including a body 31 and a cross head 32 vertically movable relative to the body 31. The body 31 includes a hydraulic cylinder 33 for inputting vibrations to the engine mount 1. The cross head 32 includes a measurement part 34 for measuring the transmission force output from the engine mount 1.

The hydraulic cylinder 33 includes a vertically movable stage 35. The stage 35 vertically moves in a predetermined pattern by controlling a servo valve 36 through the main control panel 42 and thereby controlling the hydraulic pressure to be supplied to the hydraulic cylinder 33.

The cross head 32 is configured to be vertically movable by an unshown up/down cylinder. The measurement part 34 is fixed to the bottom face of the cross head 32 and includes a fixing part to which the fitting 12 of the engine mount 1 is to be fixed and a load cell for measuring the load acting on the fixing part. The detected signal of the load cell is input via the main control panel 42 to the computer 5.

The shaker 3 has a structure in which the engine mount 1 can be mounted in an upside-down position thereto. In other words, the case 11 is fixed to the stage 35 of the body 31 while the fitting 12 is fixed to the measurement part 34 of the cross head 32.

In inspecting the engine mount 1 while inputting vibrations to it, the cross head 32 is moved down to apply a static load to the engine mount 1 to put the engine mount 1 into a 1G state and, in this state, the hydraulic cylinder 33 is driven according to a control signal from the main control panel 42. Thus, the stage 35 is vertically displaced in the predetermined pattern, whereby vibrations in a predetermined pattern are input to the case 11 of the engine mount 1.

While vibrations are input to the case 11, the load acting on the fitting 12 is detected by the load cell of the measurement part 34 and the detected measurement signal is input via the main control panel 34 to the computer 5. In this manner, the transmission force of the engine mount 1 is measured.

Figure 5:
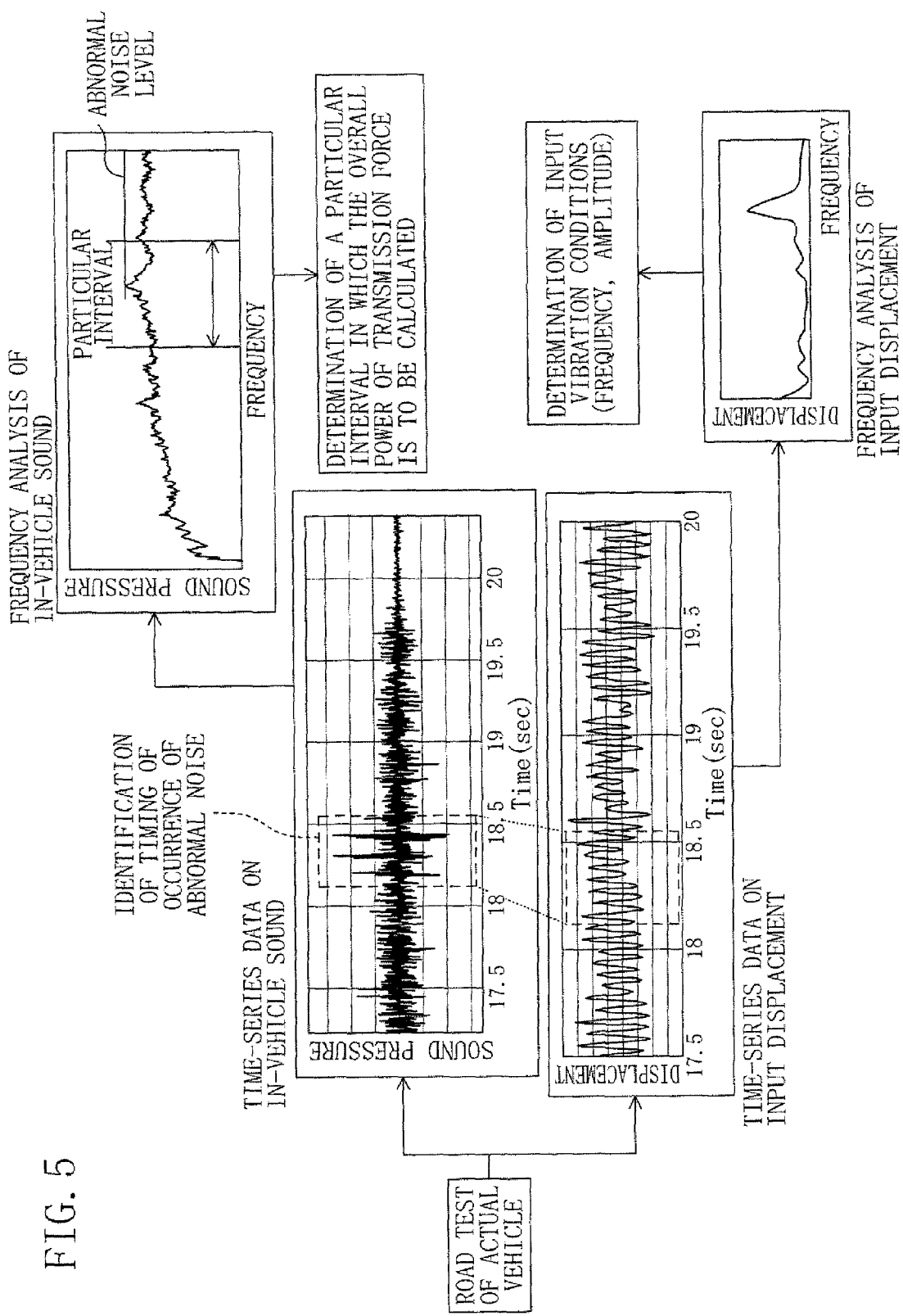
FIG. 5 is a diagram illustrating a procedure for determining conditions of vibration input to the engine mount.

Next, a description is given of the determination of conditions of vibrations to be input to the engine mount 1 in the shaker 3 with reference to FIG. 5. The determination of these input vibration conditions is carried out based on results of a road test of an actual vehicle.

First, in a vehicle of which engine is supported by the engine mount 1, the engine mount 1 is set to allow measurement of input displacement of the engine mount 1 (amount of change in position input to the case 11 owing to relative position change between the vehicle body and the engine) and a microphone is set in the passenger compartment. Then, while the vehicle is driven under various predetermined conditions (including driving on a specified road, such as a punishing road, constant-speed driving and acceleration driving), time-series data on the input displacement of the engine mount 1 and time-series data on in-vehicle sound are acquired.

The acquired time-series data on in-vehicle sound is reproduced to identify the timing of occurrence of abnormal noise (see the enclosure of a dotted line). Then, the time-series data within the identified period is frequency analyzed to identify the frequency of the abnormal noise. Based on the identified frequency of the abnormal noise, a particular frequency interval in which the below-described overall power of transmission force is to be calculated is determined. Specifically, the particular frequency interval is determined so as to include the frequency of the abnormal noise in question and the determined particular frequency interval is stored in the below-described overall calculating section.

On the other hand, the time-series data on the input displacement of the engine mount 1 is also frequency analyzed within the same period (see the enclosure of a dotted line) as the timing of occurrence of the abnormal noise. Thus, the input displacement of the engine mount 1 upon occurrence of the abnormal noise in the passenger compartment is identified. Therefore, based on this identified input displacement, a frequency and an amplitude are determined as input vibration conditions in the shaker 3.

In this embodiment, as described previously, estimation is made of whether steady abnormal noise occurs or not and whether unsteady abnormal noise occurs or not. In estimating whether steady abnormal noise occurs, the shaker 3 inputs sine-wave vibrations to the engine mount 1. On the other hand, in estimating whether unsteady abnormal noise occurs, the shaker 3 inputs to the engine mount 1 constant-amplitude sine-wave vibrations of which frequency is swept over a predetermined range. Therefore, in this embodiment, the frequency and amplitude of input vibrations are determined for the estimation of whether steady abnormal noise occurs and the amplitude of input vibrations and the frequency range of thereof to be swept are also determined for the estimation of whether unsteady abnormal noise occurs.

Figure 6:
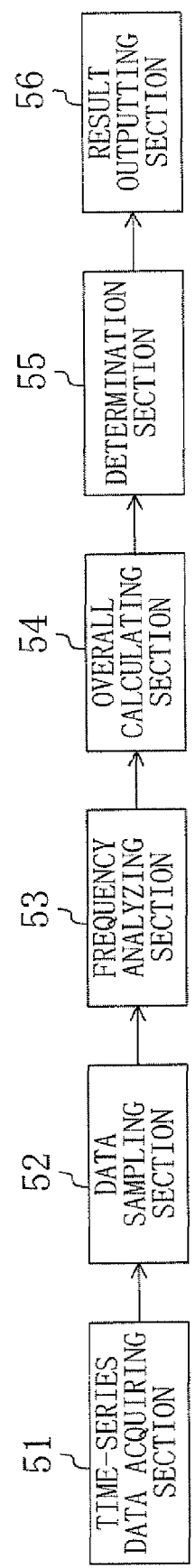
FIG. 6 is a processing block diagram showing processings that a computer executes for the inspection of steady abnormal noise.

FIG. 6 shows the configuration of processing blocks implemented by the computer 5 by executing a predetermined program for the estimation of whether steady abnormal noise occurs. The processing blocks include a time-series data acquiring section 51, a data sampling section 52, a frequency analyzing section 53, an overall calculating section 54, a determination section 55 and a result outputting section 56.

The time-series data acquiring section 51 acquires, via the main output panel 42, time-series data on the transmission force of the engine mount 1 output from the measurement part 34 (load cell) of the shaker 3.

The data sampling section 52 samples the acquired time-series data with a specified frequency.

The frequency analyzing section 53 performs Fourier transforms on the time-series data on the transmission force sampled by the data sampling section 52, thereby calculating the power spectrum of the transmission force. In the calculation, the data may be averaged such as by summation averaging.

Figure 7:
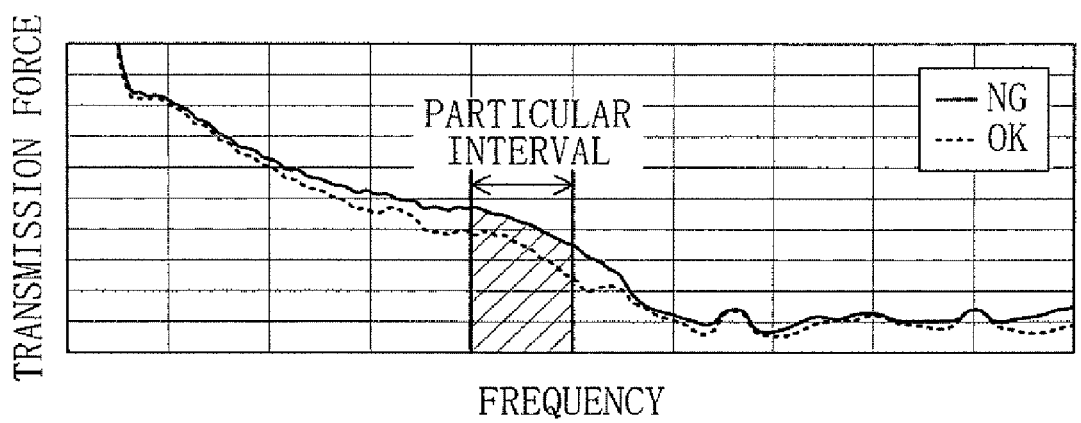
FIG. 7 is a conceptual diagram showing the overall power in a particular frequency interval for the inspection of steady abnormal noise.

The overall calculating section 54 stores a predetermined particular frequency interval as described previously and calculates the overall power in the particular frequency interval (a so-called partial overall) as shown in the shaded area of FIG. 7.

The determination section 55, as described later, stores a predetermined evaluation threshold and determines whether the overall power calculated by the overall calculating section 54 is larger than the evaluation threshold. The result outputting section 56 outputs the determination result of the determination section 55, for example, in the form of an indication on an indicator.

Figure 8:
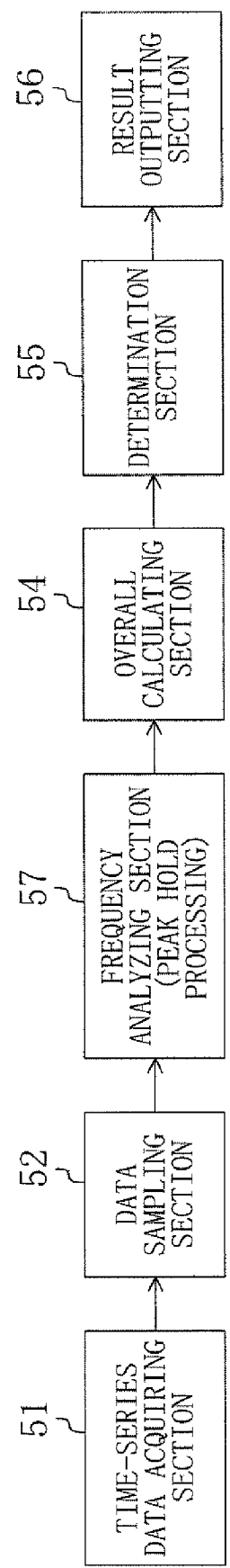
FIG. 8 is a processing block diagram showing processings that the computer executes for the inspection of unsteady abnormal noise.
Figure 9:
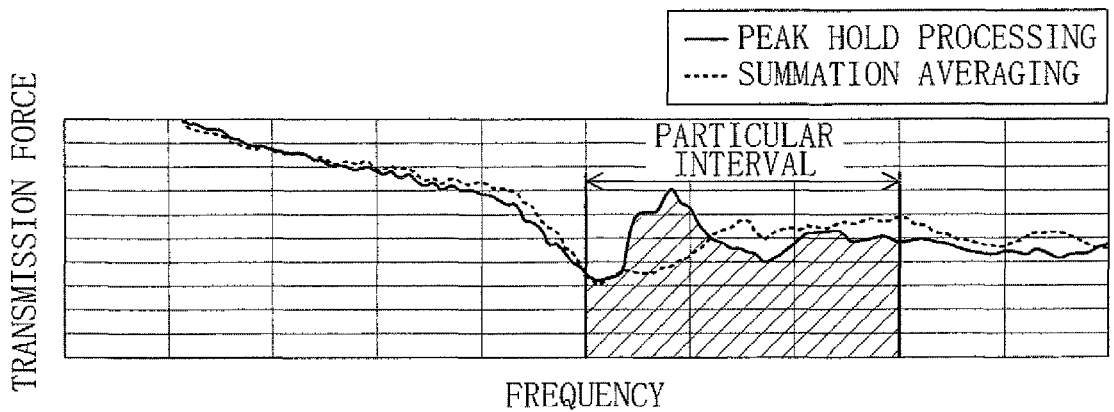
FIG. 9 is a conceptual diagram showing the overall power in a particular frequency interval for the inspection of unsteady abnormal noise.

FIG. 8 shows the configuration of processing blocks implemented by the computer 5 for the estimation of whether unsteady abnormal noise occurs. The processing blocks shown in FIG. 8 are different from those shown in FIG. 6 in that the frequency analyzing section 57 calculates the power spectrum of the transmission force by using a peak hold processing (see the solid line in FIG. 9). Thus, the overall calculating section 54, as shown in the shaded area in FIG. 9, calculates a partial overall using the power spectrum after it is subjected to the peak hold processing.

Next, a description is given of a method for determining the evaluation threshold for the determination in the determination section 55. First, a plurality of engine mounts 1 having different transmission forces are prepared and then assembled into different vehicles, thereby preparing vehicles in each of which its engine is supported by an associated one of the plurality of engine mounts 1. Then, while each finished vehicle is actually driven, the abnormal noise level in the passenger compartment is measured and the inspector sensorily evaluates whether abnormal noise occurs or not.

Figure 10:
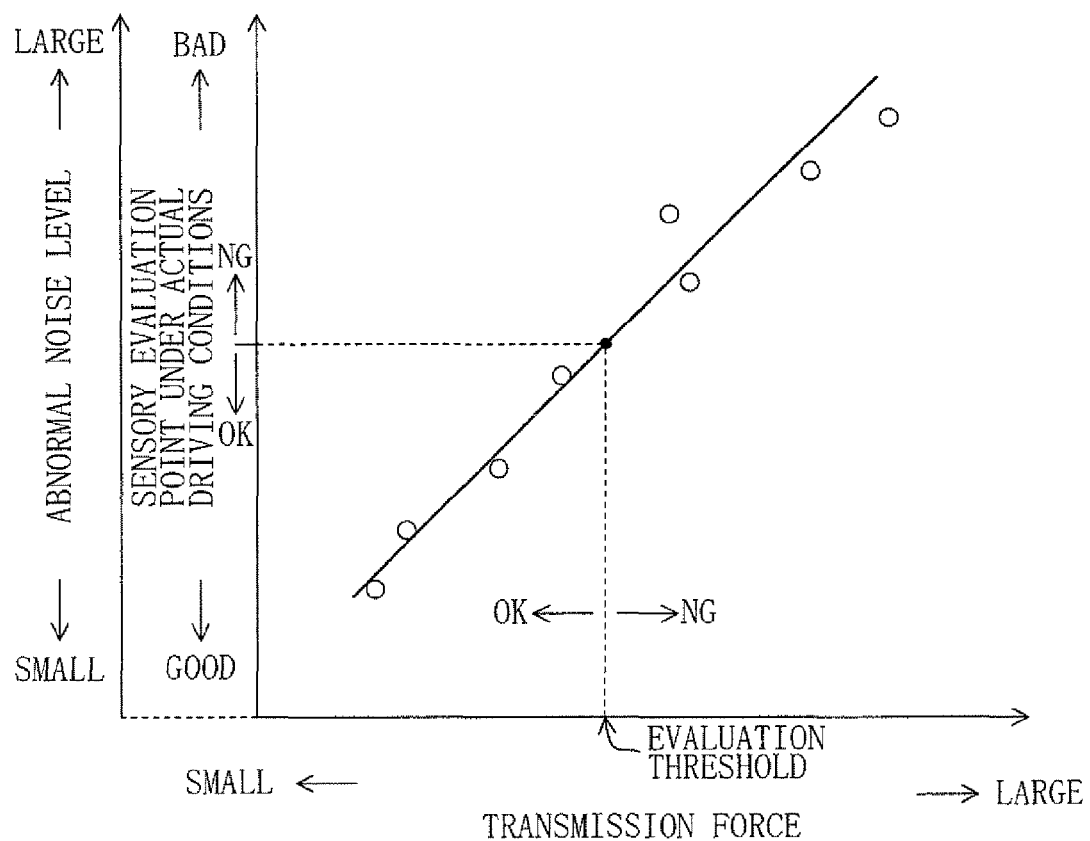
FIG. 10 is a graph showing the relation of sensory evaluation point and abnormal noise level with transmission force.

Thus, for each of steady abnormal noise and unsteady abnormal noise, as for example shown in FIG. 10, a relation of sensory evaluation point and abnormal noise level with the magnitude of transmission force (e.g., a proportionality relation shown in the straight line in FIG. 10) is obtained. Furthermore, the threshold of whether abnormal noise occurs or not in the passenger compartment is determined based on the sensory evaluation or the measured abnormal noise level.

Therefore, the evaluation threshold for the determination in the determination section 55 is determined by the intersection of the determined threshold and the straight line and then stored in the determination section 55.

Procedure for Inspecting Engine Mount for Abnormal Noise

Figure 11:
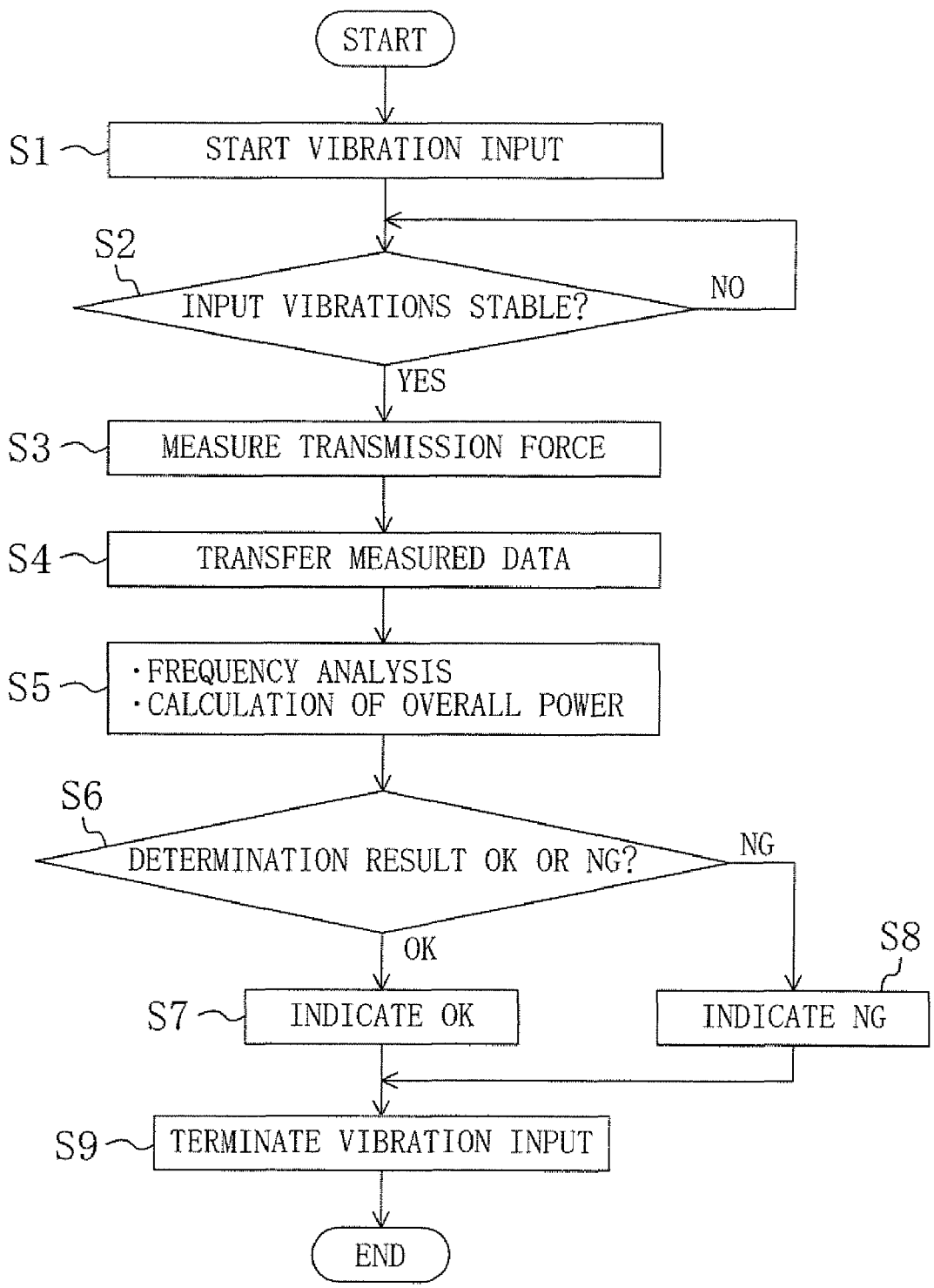
FIG. 11 is a flowchart showing a procedure for inspecting the engine mount for abnormal noise.

Next, a description is given of an inspection procedure for the engine mount 1 in the abnormal noise inspection system with reference to the flowchart shown in FIG. 11. Note that the inspection procedure for steady abnormal noise and the inspection procedure for unsteady abnormal noise are equal to each other. Therefore, an actual inspection procedure can be implemented by first executing Steps S1 to S9 in the following process flow as an inspection procedure for steady abnormal noise and then executing Steps S1 to S9 in the same process flow again as an inspection procedure for unsteady abnormal noise. Alternatively, another actual inspection procedure can be implemented by first executing Steps S1 to S6 in the following process flow as an inspection procedure for steady abnormal noise, then executing Steps S1 to S6 in the same process flow again as an inspection procedure for unsteady abnormal noise and then concurrently indicating the result of steady abnormal noise inspection and the result of unsteady abnormal noise inspection (i.e., executing Steps S7 and S8 in the process flow).

First, in Step S1, vibrations start to be input to the engine mount 1 mounted to the shaker 3. In a steady abnormal noise inspection, sine-wave vibrations of predetermined frequency are input to the engine mount 1. In an unsteady abnormal noise inspection, sine-wave vibrations of which frequency is swept are input to the engine mount 1. In the subsequent Step S2, it is determined whether the applied vibrations are stable or not. If the vibrations are not stable, i.e., the determination is NO, the process flow goes back to Step S2. If the vibrations are stable, i.e., the determination is YES, the process flow proceeds to Step S3.

In Step S3, the transmission force is measured by the load cell. In the subsequent Step S4, the measured data (time-series data on the transmission force) is transferred through the main control panel 42 to the computer 5.

In Step S5, as described previously, the computer 5 performs frequency analysis on the time-series data on the transmission force and calculates an overall power. In Step S6, whether abnormal noise occurs or not is determined from magnitude comparison between the calculated overall power and the evaluation threshold. If the determination result is OK, i.e., it has been determined that abnormal noise does not occur, the process flow proceeds to Step S7 and in Step S7 "OK" is indicated on a specified indicator (not shown). On the other hand, if the determination result is NQ i.e., it has been determined that abnormal noise occurs, the process flow proceeds to Step S8 and in Step S8 "NG" is indicated on the indicator. Then, in Step S9, vibration input is terminated to end the inspection.

As described previously, according to the inspection method of this embodiment, an abnormal noise inspection for a vehicle can be executed with the engine mount 1 independently of the vehicle, i.e., whether abnormal noise occurs or not can be estimated without assembling the engine mount 1 into the vehicle. This enhances the inspection efficiency and eliminates the need for additional work, such as replacement of the engine mount 1, to significantly reduce the cost.

Furthermore, since whether abnormal noise occurs or not is estimated based on an overall power of transmission force as described previously, variations in sensitivity of the vehicle body into which the engine mount 1 is to be assembled can be absorbed in spite of the engine mount 1 being inspected separately, thereby enhancing the determination precision.

Whether abnormal noise occurs or not can be determined not based on an overall power of transmission force but based on, for example, the power of transmission force at a particular frequency In this case, however, variations in vehicle body sensitivity are not taken into consideration, as described previously. Therefore, the determination precision becomes poorer.

Furthermore, in estimating whether abnormal noise due to an unsteady phenomenon occurs or not, vibrations of which frequency is swept are input as input vibrations to the engine mount and a peak hold processing is used to calculate the power spectrum of the transmission force output from the engine mount. Therefore, whether unsteady abnormal noise occurs or not can be estimated with high precision.

Although in the above embodiment abnormal noise inspection is directed to an engine mount 1 in which its vehicle body-side mounting part and engine-side mounting part are substantially vertically disposed, the inspection may be directed, for example, to a so-called bush type engine mount 1 in which its engine-side mounting part is disposed inwardly of the vehicle body-side mounting part.

Furthermore, the inspection target is not limited to liquid-filled mounts. Furthermore, potential inspection targets of the present invention are not limited to engine mounts and the present invention can be widely applied to anti-vibration devices that can be used in vehicles to support suspensions, exhaust pipes or the like.

The present invention is not limited to the above embodiment but can be implemented in various forms without departing from its spirit and essential characteristics. The above embodiment should therefore be considered in all respects as illustrative only but not restrictive. The scope of the invention is indicated by the claims but not at all restricted to the description. Furthermore, all modifications and changes which come within the range of equivalents of the claims are intended to be embraced within the scope of the invention.

What is claimed is:

1. An abnormal noise inspection method for an anti-vibration device for vehicle use, the method comprising:
   mounting to a shaker an anti-vibration device including a vehicle body-side mounting part and a supported member-side mounting part;
   inputting vibrations in a predetermined pattern to the supported member-side mounting part of the anti-vibration device;
   measuring, during the inputting of vibrations, a transmission force output from the vehicle body-side mounting part of the anti-vibration device;
   frequency analyzing time-series data on the transmission force to obtain a power spectrum of the transmission force; and
   determining an estimation, based on the power spectrum of the transmission force and according to a predetermined evaluation criterion, whether a vehicle produces abnormal noise in a passenger compartment owing to the anti-vibration device when the vehicle runs with the anti-vibration device mounted thereon.

2. The abnormal noise inspection method of claim 1, wherein
   in frequency analyzing time-series data on the transmission force, the power spectrum of the transmission force is used to calculate an overall power in a particular frequency interval including a frequency of abnormal noise to be produced in the passenger compartment, and
   the determining an estimation whether abnormal noise occurs or not in the passenger compartment is based on whether the overall power is above a predetermined threshold.

3. The abnormal noise inspection method of claim 2, wherein, in inputting vibrations, sine-wave vibrations of constant amplitude and constant frequency are input to the supported member-side mounting part of the anti-vibration device.

4. The abnormal noise inspection method of claim 1, wherein
   in frequency analyzing, the power spectrum of the transmission force is subjected to a peak hold processing and the power spectrum, after being subjected to the peak hold processing, is used to calculate an overall power in a particular frequency interval including a frequency of abnormal noise to be produced in the passenger compartment, and
   the determining an estimation whether abnormal noise occurs or not in the passenger compartment is based on whether the overall power is above a predetermined threshold.

5. The abnormal noise inspection method of claim 4, wherein, in inputting vibrations, sine-wave vibrations of constant amplitude of which frequency is swept over a predetermined range are input to the supported member-side mounting part of the anti-vibration device.

* * * * *

UNITED STATES PATENT AND TRADEMARK OFFICE
CERTIFICATE OF CORRECTION

PATENT NO. : 8,214,104 B2
APPLICATION NO. : 12/044023
DATED : July 3, 2012
INVENTOR(S) : Katsutoshi Ohta et al.

It is certified that error appears in the above-identified patent and that said Letters Patent is hereby corrected as shown below:

Title Page, Item (73) Assignee should read: Kurashiki Kako Co., Ltd.

Signed and Sealed this
Eleventh Day of December, 2012

David J. Kappos
*Director of the United States Patent and Trademark Office*